(12) United States Patent
Foust et al.

(10) Patent No.: US 11,567,895 B2
(45) Date of Patent: Jan. 31, 2023

(54) METHOD, APPARATUS AND SYSTEM FOR DYNAMIC CONTROL OF CLOCK SIGNALING ON A BUS

(71) Applicant: Intel Corporation, Santa Clara, CA (US)

(72) Inventors: Kenneth P. Foust, Beaverton, OR (US); Amit Kumar Srivastava, Folsom (CA); Nobuyuki Suzuki, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 76 days.

(21) Appl. No.: 17/337,497

(22) Filed: Jun. 3, 2021

(65) Prior Publication Data
US 2021/0286754 A1    Sep. 16, 2021

Related U.S. Application Data

(63) Continuation of application No. 15/635,299, filed on Jun. 28, 2017, now Pat. No. 11,030,142.

(51) Int. Cl.
| | | |
|---|---|---|
| *G06F 13/38* | (2006.01) | |
| *G06F 13/42* | (2006.01) | |
| *G06F 13/364* | (2006.01) | |
| *G06F 13/24* | (2006.01) | |

(52) U.S. Cl.
CPC .......... *G06F 13/4291* (2013.01); *G06F 13/24* (2013.01); *G06F 13/364* (2013.01)

(58) Field of Classification Search
CPC ..... G06F 13/4291; G06F 13/24; G06F 13/364
See application file for complete search history.

(56) References Cited

U.S. PATENT DOCUMENTS

| | | | |
|---|---|---|---|
| 7,683,692 B2 | 3/2010 | Lambrecht et al. | |
| 8,296,469 B2 | 10/2012 | Dunstan et al. | |
| 8,975,975 B2 | 3/2015 | Schrom et al. | |
| 9,270,326 B2 | 2/2016 | Kesling et al. | |
| 9,690,725 B2 * | 6/2017 | Sengoku | G06F 13/24 |
| 9,727,506 B2 * | 8/2017 | Takahashi | G06F 13/404 |
| 9,904,637 B2 * | 2/2018 | Sengoku | G06F 13/3625 |
| 9,960,981 B2 * | 5/2018 | Takahashi | H04L 1/0041 |
| 9,990,316 B2 * | 6/2018 | Mishra | G06F 13/4282 |

(Continued)

FOREIGN PATENT DOCUMENTS

| | | | | | |
|---|---|---|---|---|---|
| CN | 100527102 C | * | 8/2009 | ......... | G06F 13/4072 |
| CN | 101667152 A | * | 3/2010 | | |
| FR | 2728705 A1 | * | 6/1996 | ......... | G06F 13/4213 |

OTHER PUBLICATIONS

MIPI Alliance, "Specification Brief, Audio & Control: SLIMbus®, SoundWireSM," Oct. 7, 2014, 1 page.

*Primary Examiner* — Cheng Yuan Tseng
(74) *Attorney, Agent, or Firm* — Trop, Pruner & Hu, P.C.

(57) ABSTRACT

In an embodiment, a host controller includes a clock control circuit to cause the host controller to communicate a clock signal on a clock line of an interconnect, the clock control circuit to receive an indication that a first device is to send information to the host controller and to dynamically release control of the clock line of the interconnect to enable the first device to drive a second clock signal onto the clock line of the interconnect for communication with the information. Other embodiments are described and claimed.

20 Claims, 7 Drawing Sheets

(56) References Cited

U.S. PATENT DOCUMENTS

| | | | |
|---|---|---|---|
| 10,204,065 B2* | 2/2019 | Dionisio | G06F 13/4282 |
| 10,241,536 B2 | 3/2019 | Quiet et al. | |
| 10,353,837 B2* | 7/2019 | Sengoku | G06F 13/364 |
| 10,489,337 B2 | 11/2019 | Quiet et al. | |
| 11,010,328 B2* | 5/2021 | Takahashi | G06F 13/4291 |
| 2014/0229644 A1 | 8/2014 | Thanigasalam et al. | |
| 2017/0104607 A1* | 4/2017 | Sengoku | H04L 69/18 |
| 2017/0255588 A1* | 9/2017 | Pitigoi-Aron | G06F 13/364 |
| 2017/0371830 A1* | 12/2017 | Pitigoi-Aron | G06F 13/4282 |
| 2018/0052791 A1 | 2/2018 | Srivastava et al. | |
| 2018/0181531 A1* | 6/2018 | Foust | G06F 13/36 |
| 2018/0260357 A1 | 9/2018 | Amon et al. | |
| 2018/0365188 A1 | 12/2018 | Srivastava et al. | |
| 2018/0367504 A1 | 12/2018 | Srivastava | |
| 2019/0146939 A1* | 5/2019 | Lee | G06F 13/4291 |
| | | | 710/110 |

* cited by examiner

METHOD, APPARATUS AND SYSTEM FOR DYNAMIC CONTROL OF CLOCK SIGNALING ON A BUS

This application is a continuation of U.S. patent application Ser. No. 15/635,299, filed Jun. 28, 2017, the content of which is hereby incorporated by reference.

TECHNICAL FIELD

Embodiments relate to communication of information on bus structures.

BACKGROUND

Many different types of known buses and other interfaces are used to connect different components using a wide variety of interconnection topologies. For example, on-chip buses are used to couple different on-chip components of a given integrated circuit (IC) such as a processor, system on a chip or so forth. External buses can be used to couple different components of a given computing system either by way of interconnect traces on a circuit board such as a motherboard, wires and so forth.

A recent multi-drop interface technology is an Improved Inter Integrated Circuit (I3C) Specification-based bus, available from the Mobile Industry Processor Interface (MIPI) Alliance™ (www.mipi.org). This interface is expected to be used to connect devices, such as internal or external sensors or so forth, to a host processor, applications processor or standalone device via a host controller or input/output controller. This multi-drop bus provides for single-ended bi-directional data communication with a single-ended clock signal.

DETAILED DESCRIPTION

In various embodiments, techniques are provided to enable a master device to release control of a clock line of an interconnect to one or more other devices (such as a slave device) during communications with the device. Although embodiments are not limited in this regard, in some cases this slave device may have certain compute capabilities and the capability of generating and driving a clock signal onto the interconnect. As examples, such devices may include a touchscreen controller, secondary master or peer-to-peer slave device, among other such devices.

Via an in-band interrupt (IBI), a peripheral slave device can interrupt a master device (also a "master" herein) in an in-band manner. In doing so, the interrupting slave device (also a "slave" herein) drives a bi-directional data line while the master drives a clock line. While this operation may be appropriate for many slave devices such as inexpensive sensor-type slave devices that do not have an accurate high speed internal clock, such operation can place limits on the performance of the bus speed, as data being communicated on the bus may originate from the opposite end (slave end) of the bus than the clock line (master end). The resulting propagation delay time and clock-to-data turnaround delays are key reasons that the current version of the I3C Specification is limited to a native communication frequency of 12.5 megahertz (MHz).

The clock control techniques described herein can be used in various communication instances. In many cases, this clock control may be for IBI and/or mandatory data byte(s) (MDB) transmission to allow for more reliable and faster clocking than a standard clock rate for a given specification. For example, in embodiments this clock rate can far exceed the current native 12.5 MHz clock rate of the I3C specification, since the clock and data lines can originate with the same source. With these techniques, an interconnect in accordance with an embodiment may be used in high bandwidth/low latency applications, such as transporting unprocessed touchscreen data with minimal latency.

In an embodiment, a slave device having clock sourcing capability may communicate this capability to the master, e.g., during bus initialization. More specifically, the slave device can inform the master that it can drive the clock line, e.g., during IBI MDB read operation. Although embodiments are not limited in this regard, in some cases a slave device can communicate this configuration information via one of many possible methods (e.g., a bus characteristics register information, common command code, private messaging, etc.).

When configured and clock control is granted by the master, data and clock signals may both originate from the same source, ensuring that propagation and clock-to-data turnaround delays are mitigated, thus allowing the bus to operate at faster clock rates. In some embodiments, the common clock and data origination may enable communication frequencies that may approach approximately 40 MHz. In various embodiments, a slave device may drive a clock line of an interconnect during any point of a basic I3C read transmission, such as an SDR-based IBI with a mandatory data byte (MDB). Embodiments may reduce read latency in systems that leverage a bus having bi-directional clock capabilities, such as a low power sub-system (LPSS), a collection of low-speed, low-power I/O devices and/or sensing systems.

Table 1 below indicates operations performed on a data line of an I3C bus in accordance with an embodiment of the present invention. As shown, a slave device can take over control of both data and clock lines of the bus to communicate information and thereafter release control of the clock line. As illustrated, communication on the data line of a I3C bus begins in an open drain state where a slave pulls the data line low while it is in an open drain state. Thereafter, the slave issues its address as an IBI/read request. To acknowledge this request, the master then issues an acknowledgement. At this point, (and assuming slave device clock control capability) a hand-off may occur where the master enables the slave device to control both the clock and data lines of the interconnect. In the embodiment shown in Table 1, this hand-off may include the master device pulling the clock line high. Thereafter, a push-pull operation occurs such that the slave communicates a byte of information. After that communication, a T-bit is driven high or low and then the data line is placed into a high impedance state (High-Z). Thereafter push-pull operation occurs where a STOP occurs, ending the slave communication and returning clock control to the master.

TABLE 1

| Open Drain | Open Drain | Open Drain | Hand Off | SCL Slave Push-Pull | And SDA Drive High or Low, and then High-Z | Drive Push-Pull |
|---|---|---|---|---|---|---|
| S | Slave_addr_as_IBI/R | Master_ACK | SCL High | Slave_byte | T | P |

Figure 1:
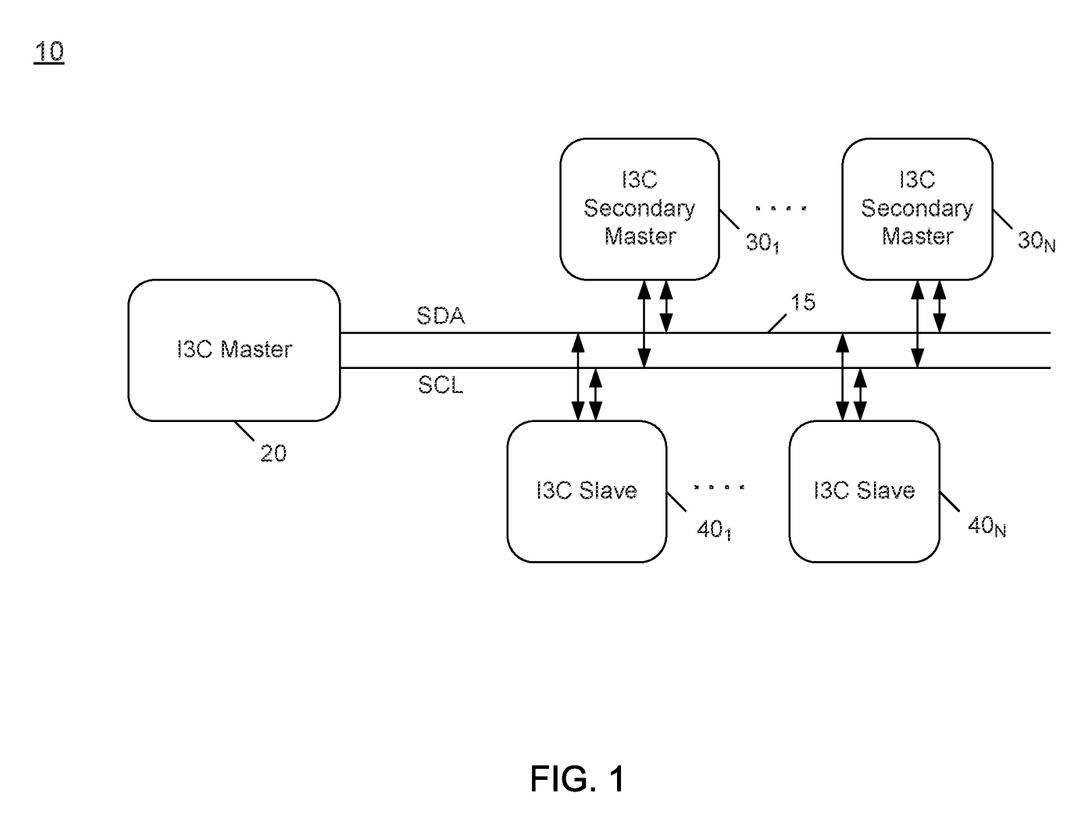
FIG. 1 is a block diagram of a system in accordance with an embodiment of the present invention.

Referring now to FIG. 1, shown is a block diagram of a system in accordance with an embodiment of the present invention. More specifically, system 10 shown in FIG. 1 represents at least a portion of any one of a variety of different types of computing devices. In different embodiments, such computing devices can range from relatively small low power devices such as a smartphone, tablet computer, wearable device or so forth, to larger devices such as laptop or desktop computers, server computers, automotive infotainment devices and so forth. In any case, system 10 includes a bus 15. In embodiments herein, bus 15 may be implemented as an I3C bus in accordance with the I3C Specification. However, understand the scope of the present invention is not limited in this regard and in other embodiments, bus 15 may be implemented as any type of multi-drop interconnect.

As illustrated, a primary or main master device 20 couples to bus 15. In various embodiments, master device 20 may be implemented as a host controller that includes hardware circuitry to act as a bus master for bus 15. Master device 20 may include a controller (not shown in the high level view of FIG. 1) to control data (SDA) and clock (SCL) lines, as well as use (e.g.) internal current sources or passive pullups to hold bus 15 when all coupled devices are powered off. In some cases, master device 20 may be a relatively simple host controller for a low complexity bus or other multi-drop bus, such as in accordance with an I²C or I3C Specification. Other multi-drop interfaces such as Serial Peripheral Interface and/or Microwire also may be present in a particular embodiment.

In different implementations, master device 20 may be an interface circuit of a multicore processor or other system on chip (SoC), application processor or so forth. In other cases, master device 20 may be a standalone host controller (such as a given integrated circuit (IC)) or main master device for bus 15. And of course other implementations are possible. In other cases, master device 20 may be implemented as hardware, software, and/or firmware or combinations thereof, such as dedicated hardware circuit, e.g., a programmable logic, to perform bus master activities for bus 15.

Note that bus 15 is implemented as a two-wire bus in which a single serial line forms a data interconnect and another single serial line forms a clock interconnect. As such, data communications can occur, e.g., in bi-directional manner and clock communication can occur in a single direction (with potentially different originators as described herein). Master device 20 may be a relatively compute complex device (as compared to other devices on bus 15) that consumes higher power than other devices coupled to bus 15.

As shown in FIG. 1, multiple secondary master devices $30_1$-$30_N$ are present. In various embodiments, secondary master devices 30 (generically) may be implemented as dedicated master or bridge devices such as standalone IC's coupled to bus 15. In other cases, these devices may be independent logic functionality of a SoC or other processor (and in some cases may be implemented in the same IC as master device 20, known as a secondary master). As will be described herein one or more such secondary master devices 30 may be controlled to act as bus master for bus 15 while main master device 20 is in a low power state, to enable bus operations to continue to proceed while in this low power state. In embodiments, one or more of secondary master devices 30 may include clock generation circuitry such that these devices may control and direct a clock signal onto the clock interconnect of bus 15 to communicate information in an optimized manner.

As further illustrated in FIG. 1, a plurality of slave devices $40_1$-$40_N$ also couple to bus 15. In different embodiments, slave devices 40 (generically) may take many different forms. For purposes of discussion herein, it may be assumed that slave devices 40 may be always on (AON) devices, such as sensors like micro-electrical mechanical systems (MEMS), imaging sensors, peer-to-peer devices, debug devices or so forth. In embodiments, one or more of slave devices 40 may include clock generation circuitry such that these devices may control and direct a clock signal onto the clock interconnect of bus 15 to communicate information in an optimized manner. As examples, one or more slave devices 40 may be a given type of sensor, such as an accelerometer or other sensor which may be incorporated in a given system (such as a smartphone or other mobile platform).

At a high level, master device 20 is configured to dynamically enable one or more of devices 30, 40 to source a clock signal for the clock line (SCL) of bus 15 based on device capability and possibly an operational phase. For purposes of discussion herein, assume devices 30, 40 operate as slaves to master device 20. One or more devices 30, 40 may be powered when they are to be active, such as a type of sensor, e.g., a camera device that is powered on only when a camera functionality of the system is active. Other devices 30, 40 may be powered when coupled to bus 15. In one case, a device may be a slave device that can be physically added/removed via a hot plug or hot unplug operation, such as a cable, card or external peripheral device that is coupled to bus 15, e.g., by a cable, external connection or so forth. Understand while shown at this high level in the embodiment of FIG. 1, many variations and alternatives are possible.

Figure 2:
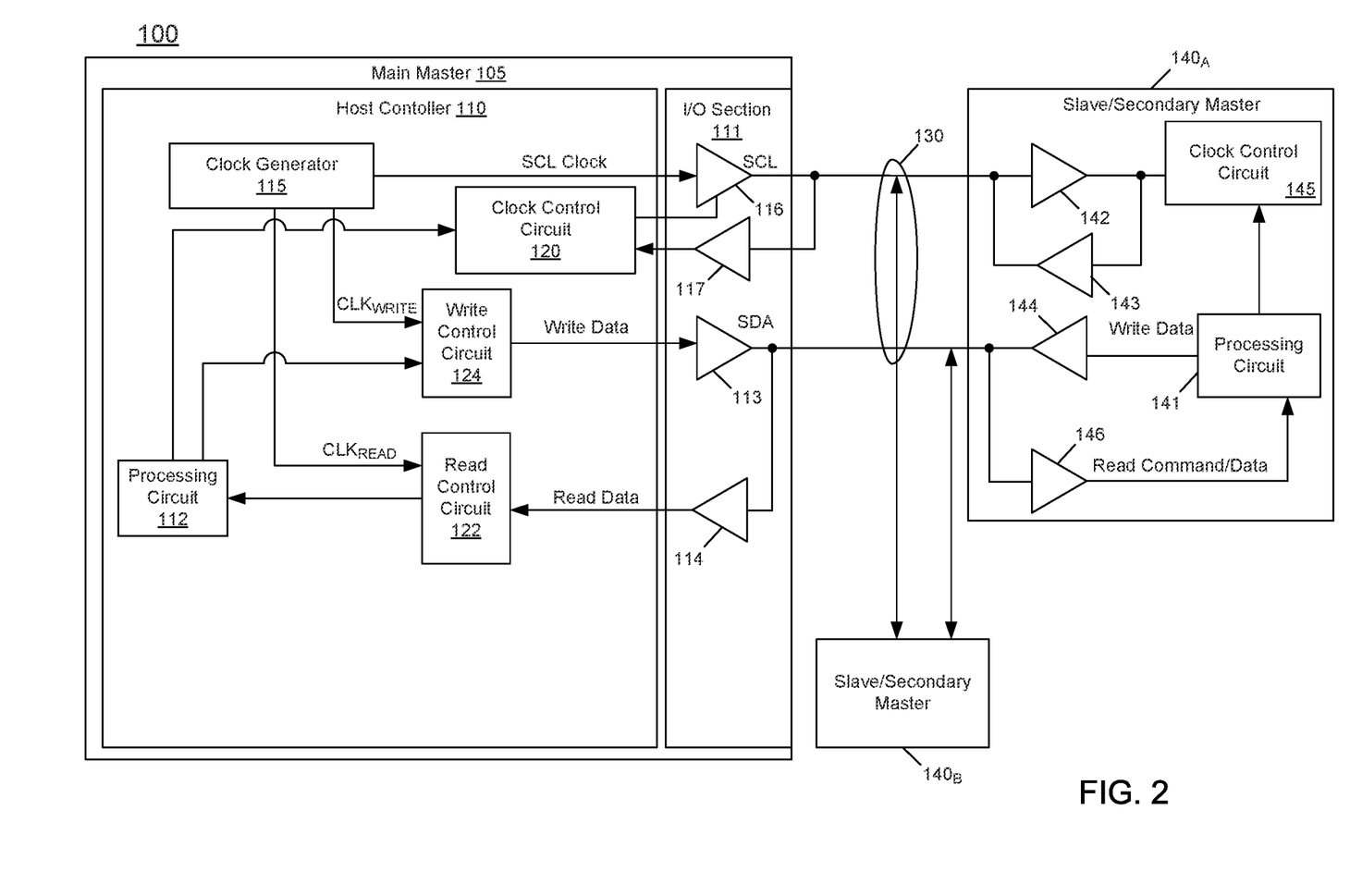
FIG. 2 is a block diagram of a system in accordance with another embodiment of the present invention.

Referring now to FIG. 2, shown is a block diagram of another system in accordance with an embodiment of the present invention. As shown in FIG. 2, a portion of a system 100 includes a main master 105 including a host controller 110 coupled to a plurality of devices $140_A$-$140_B$ via a multi-drop bus 130. As further illustrated, main master 105 includes an input/output (I/O) section 111. Devices 140 (also referred to herein as "slaves") may have different operational characteristics and also may have different capabilities of being added/removed from bus 130. As will be described herein, host controller 110 may be configured as a bus master, in at least certain operational phases. Bus 130 is implemented as a two-wire bus in which a single serial line forms a data interconnect and another single serial line forms a clock interconnect. As such, data communications can occur in bi-directional manner and clock communications can occur in a unidirectional manner.

As illustrated in FIG. 2, master device 105 includes a host controller 110 having a processing circuit 112. Understand that many different types of host controllers can be provided. As examples, host controller 110 may be an interface circuit of a multicore processor or other system on chip (SoC), application processor or so forth. In other cases, host controller 110 may be a standalone host controller for bus 130. And of course other implementations are possible. In different implementations, processing circuit 112 may represent one or more cores or other hardware processing logic of a particular device or it may simply be part of an interface circuit to act as transmitter and receiver for host controller 110. In turn, processing circuit 112 couples via a write control circuit 124 to a driver 113 that drives data onto bus 130, and via a read control circuit 122 to a receiver 114 that receives incoming data via a data line of bus 130.

Host controller 110 further includes a clock generator 115 to generate a variety of different clock signals both for internal use and for communication on bus 130. To this end, host controller 110 further includes a clock control circuit 120 to control clock generator 115 to send a clock signal to a clock line of bus 130 via corresponding driver 116 (and/or to receive a clock signal via receiver 117). In various embodiments, clock control circuit 120 may be configured to perform the dynamic clock control as described herein. For example clock control circuit 120 may access a configuration table, which in an embodiment is a non-volatile storage to store configuration information for multiple devices to couple to bus 130, including clock sourcing capabilities as described herein.

In an embodiment clock control circuit 120 may receive information regarding a device that is ready to communicate information, and determine whether this device has clock sourcing capabilities. In an embodiment, based on determination of this capability, e.g., by way of access to configuration information in a configuration table, a clock control hand-off may be performed.

Certain details regarding representative device 140$_A$ also are shown in FIG. 2. Specifically, device 140$_A$ includes a processing circuit 141, which may generate data to be written to main master 105, via a driver 114 coupled to the data line of bus 130. In addition, incoming information may be received via a receiver 146 and provided to processing circuit 141. Still further as described herein, device 140$_A$ includes a clock control circuit 145 that is capable of generating and sending a clock signal via the clock line of bus 130. To this end, when enabled by processing circuit 141, clock control circuit 145 may generate the clock signal and drive it onto the clock line of bus 130 via driver 143 (and similarly, clock control circuit 145 may receive an incoming clock signal originated in main master 105 via receiver 142). Understand while shown at this high level in the embodiment of FIG. 2, many variations and alternatives are possible.

Figure 3:
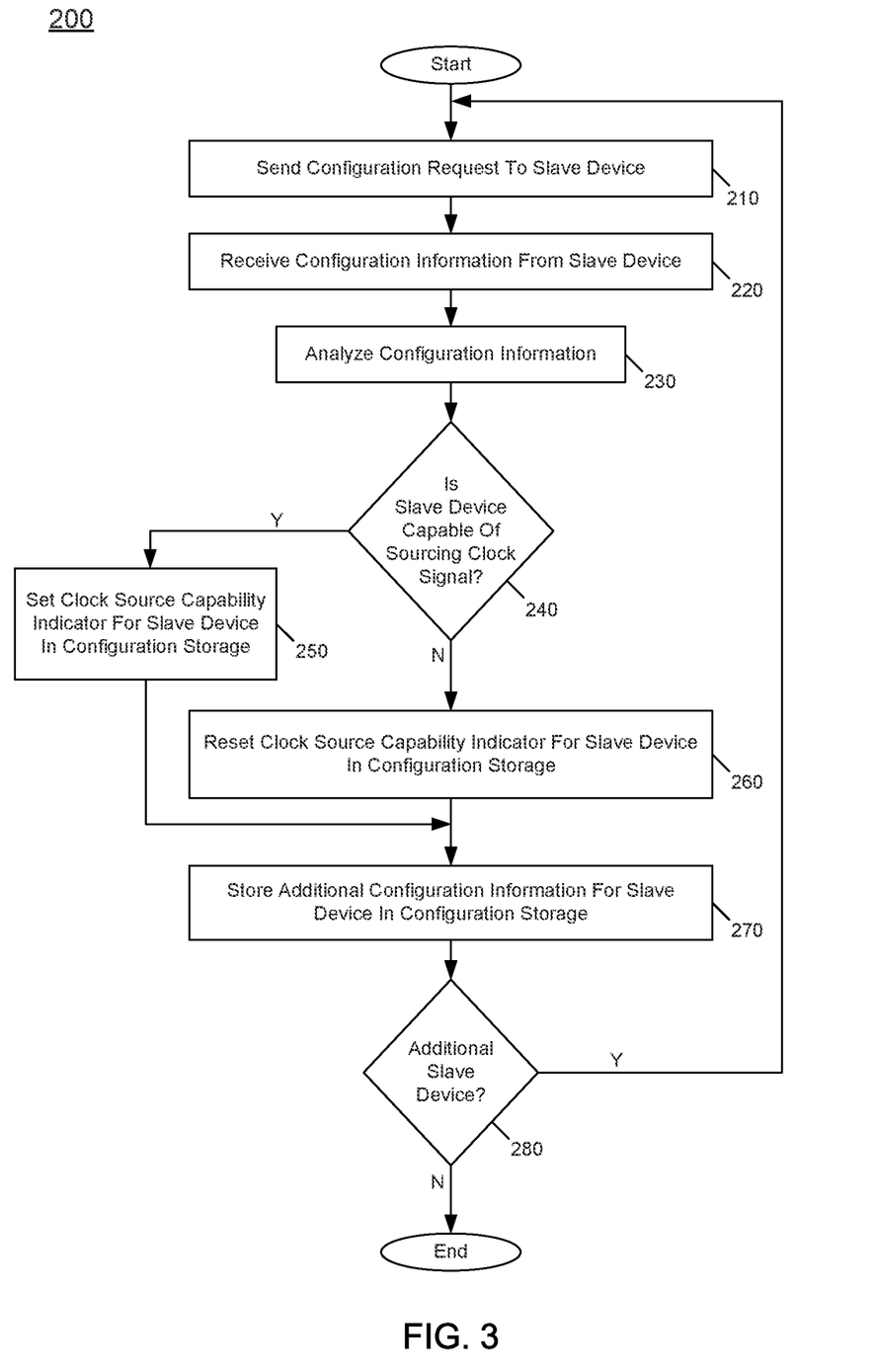
FIG. 3 is a flow diagram of a method in accordance with an embodiment of the present invention.

Referring now to FIG. 3, shown is a flow diagram of a method in accordance with an embodiment of the present invention. More specifically, method 200 of FIG. 3 is a method for identifying configuration information for one or more slave devices coupled to an interconnect as described herein. As such, method 200 may be performed by a host controller, which may include hardware circuitry, software, firmware and/or combinations thereof to perform method 200.

As illustrated, method 200 begins by sending a configuration request to a slave device (block 210). The host controller may send this request to the slave device in response to detection of the slave device being coupled to the interconnect. This operation may occur on reset of a system including the interconnect for a fixed slave device. In other cases, such as where a slave device may be dynamically connected into the system, this request may occur responsive to detection of this new device on the interconnect.

In any event, control passes to block 220 where the host controller can receive configuration information from the slave device. This configuration information may take many different forms, but in any event it may be sufficient to identify the device and its capabilities. Of interest herein, one such capability of a device is its ability to internally generate a clock that can be used for driving information on the interconnect. As seen, at block 230 the host controller analyzes the configuration information to determine capabilities of the device.

More specifically with regard to clock control as described herein, at diamond 240 it is determined whether the slave device is capable of sourcing a clock signal. This information may be provided by way of a clock source indicator, present within the configuration information such as may be provided by bus characteristics register information, a command code, or so forth. If it is determined that the slave device is capable of sourcing a clock signal, control passes to block 250 where a clock source capability indicator for the slave device may be set. More specifically, the host controller may include or be associated with a configuration storage. In an embodiment, this configuration storage may include a configuration table including an entry for each device coupled to the interconnect. Each entry may include various configuration information for the device including, for example, its address, voltage capabilities, slew rate, and so forth. Still further, each entry may include a clock source capability indicator to indicate whether the corresponding device is capable of generating and driving a clock signal onto the interconnect. In this instance where it is determined that a given slave device is so capable, the clock source capability indicator for this device may be set (block 250). Instead if a given slave device is not capable of generating and driving a clock signal, at block 260, this clock source capability indicator for the device may be reset.

From both of blocks 250 and 260, control passes to block 270 where additional configuration information for the slave device may be stored in the configuration storage. As discussed above, various configuration information can be stored in the entry associated with the slave device. Thereafter, it is determined whether one or more additional slave devices are to be characterized (diamond 280). If so, control passes back to block 210, discussed above. Otherwise method 200 concludes. Understand while shown at this high level in the embodiment of FIG. 3, the scope of the present invention is not limited in this regard.

Figure 4:
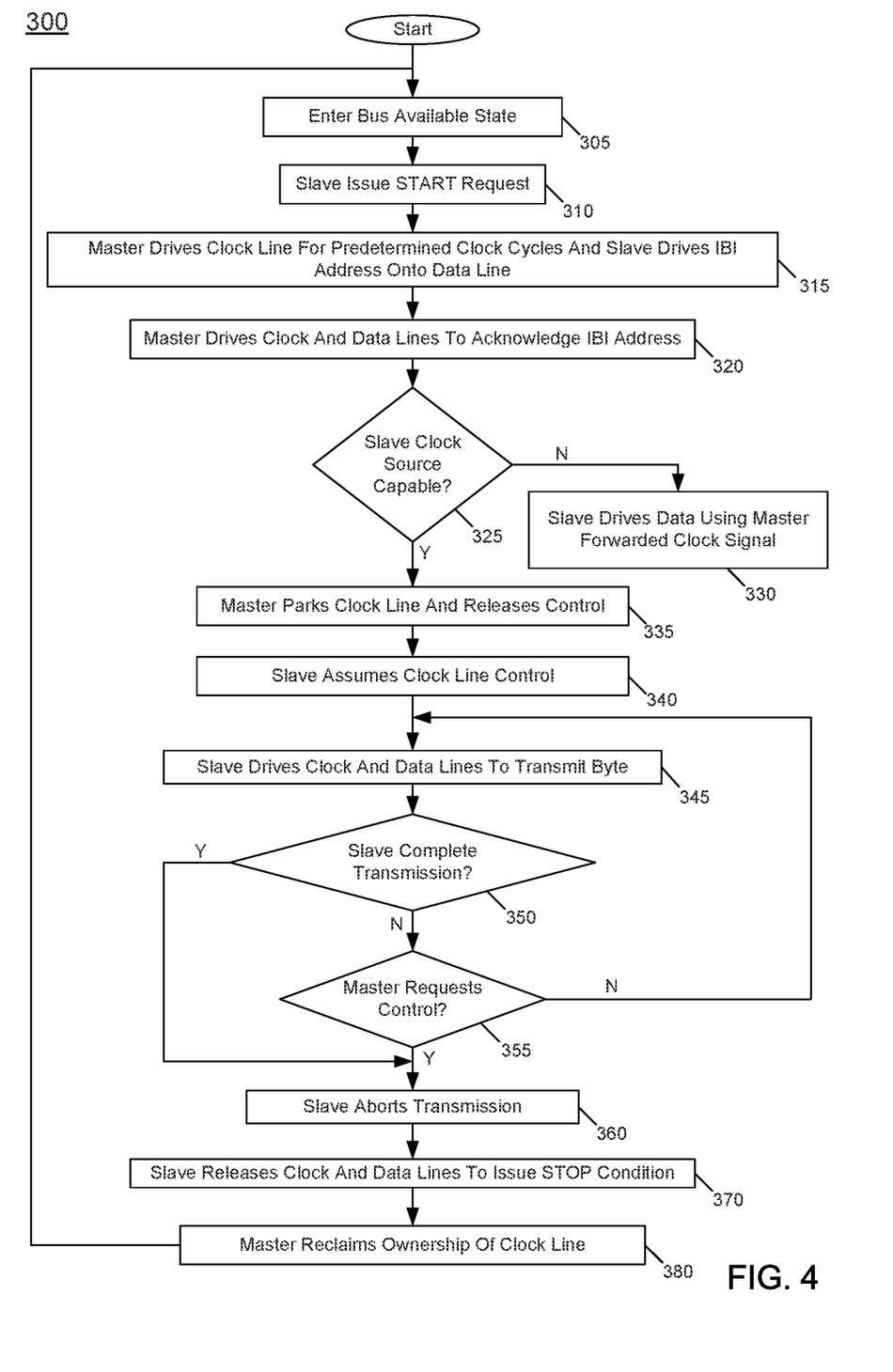
FIG. 4 is a flow diagram of a method in accordance with another embodiment of the present invention.

Referring now to FIG. 4, shown is a flow diagram of a method in accordance with another embodiment of the present invention. More specifically, FIG. 4 describes a method for performing a dynamic handoff of clock control from a master device to a slave device (and potentially back to the master device) in accordance with an embodiment. As such, portions of method 300 can be performed by a host controller and a slave controller, both of which may include hardware circuitry (such as clock control circuits), software, firmware and/or combinations thereof to enable the communications and dynamic control of clock driving as described herein. As illustrated, method 300 begins by entering into a bus available state (block 305). Although the scope of the present invention is not limited in this regard, in one embodiment this bus available state may occur when a master device sets both a clock line and a data line to a high state to indicate that the bus is available.

Next control passes to block 310 where the slave may issue a START request or other request to begin an IBI communication. In one embodiment, this request may be issued by pulling the data line of the bus low. In response to this START request, at block 315 the master drives the clock line for a predetermined number of clock cycles to enable the slave device to drive its IBI address on to the bus. For example, in an embodiment in which the IBI address is an 8-bit address, the master device may drive the clock line for 8 cycles to enable the slave device to communicate its address on the data line.

Still with reference to FIG. 4, at block 320 the master drives both clock and data lines to acknowledge the IBI address. Next it is determined at diamond 325 whether the slave device is a clock source capable device. In an embodiment, the host controller may make this determination with reference to configuration information for the slave device. More specifically as described herein, the host controller may make reference to a clock source capability indicator associated with the slave device to determine whether the slave device is clock source capable. If not, control passes to block 330, where the slave device may drive data on the data line using a clock signal forwarded from the master device. That is, without clock source capability, this bus communication may be according to the I3C Specification where the master device drives the clock signal for use by a slave device to communicate information on the bus. Note that such communication is at a native clock rate for the communication protocol. With regard to the I3C Specification, this current native data rate is 12.5 MHz.

Still with reference to FIG. 4, if it is determined that the slave device is clock source capable, control passes to block 335. At block 335, to enable a handoff of clock control from the master device to the slave device, the master may park the clock line and release control of the clock line. In an embodiment, this park operation is effected by the master device pulling the clock line high. At this point, with the clock line in a logic high state, the slave device may assume clock line control while the clock line is parked at the logic high state (block 340). Thereafter, slave sourced clock and data information can be communicated on the bus. More specifically as illustrated in FIG. 4, the slave may drive the clock and data lines for a transmitted byte (block 345). Note that this byte communication further includes a T-bit at a conclusion of the byte. By way of this T-bit, it can be determined whether the master requests control of the clock line.

As illustrated in FIG. 4, at a conclusion of each byte, the slave may determine whether its transmission is complete (diamond 350). If not, control passes to diamond 355 to determine whether the master requests control. In an embodiment, this determination may be based on the state of the T-bit, in which each device agrees to continue the current communication if this bit is logic high. If the communication is to continue, control passes back to block 345 for communication of a next byte, discussed above. Otherwise if it is determined that the master requests control, the slave device aborts further transmission (block 360). And the slave device releases the clock line (and the data line), to issue a STOP condition on the bus (block 370). In an embodiment, this STOP condition may be issued by pulling both the clock and data lines high. Control next passes to block 380 where the master device may reclaim ownership of the clock line. In an embodiment, the master's ownership may be assumed because the slave that temporarily drove the clock signal has issued a STOP (e.g., by moving SDA logic high when SCL also is logic high).

Via method 300, the master and slave devices claim control of both data and clock lines of the interconnect, ensuring that I3C signal integrity is not only maintained, but improved during, e.g., an IBI communication operation, such as an IBI MDB read operation. Understand while shown at this high level in the embodiment of FIG. 4, the scope of the present invention is not limited in this regard.

Figure 5:
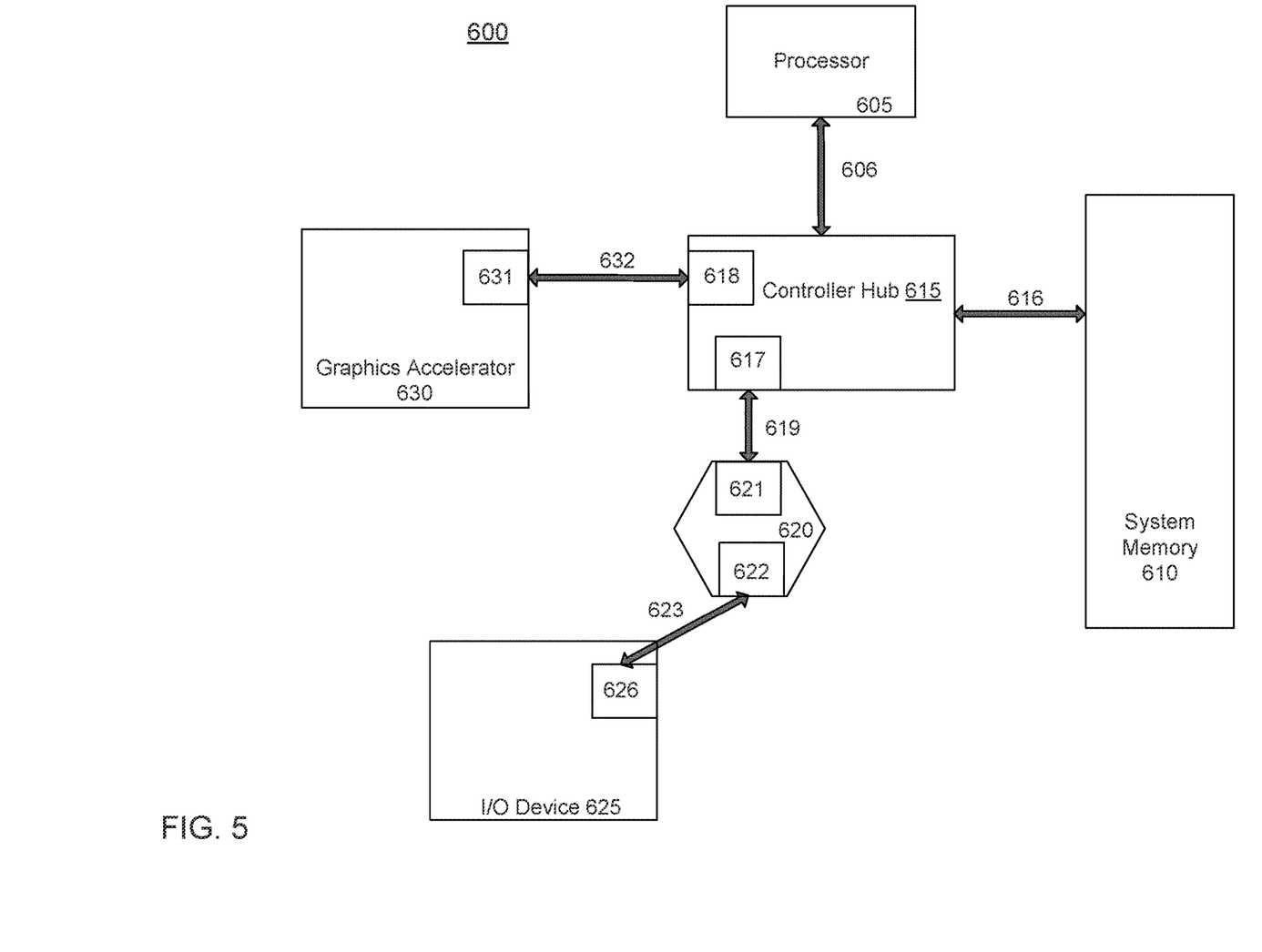
FIG. 5 is an embodiment of a fabric composed of point-to-point links that interconnect a set of components.

Embodiments may be implemented in a wide variety of interconnect structures. Referring to FIG. 5, an embodiment of a fabric composed of point-to-point links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect. In another embodiment, link 606 includes a parallel serial, differential interconnect architecture that is compliant with different interconnect standards, and which may couple with one or more host controllers that enable dynamic clock line control by various link partners as described herein.

System memory 610 includes any memory device, such as random access memory (RAM), non-volatile (NV) memory, or other memory accessible by devices in system 600. System memory 610 is coupled to controller hub 615 through a memory link 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a PCIe interconnection hierarchy. Examples of controller hub 615 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through controller hub 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e., up a hierarchy towards a root complex, to controller hub 615 and downstream, i.e., down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example, and which may enable multiple link partners to control clock signaling in multiple modes as described herein. Often in the PCIe vernacular, such a device is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. A graphics controller or the graphics accelerator 630 itself may be integrated in processor 605.

Figure 6:
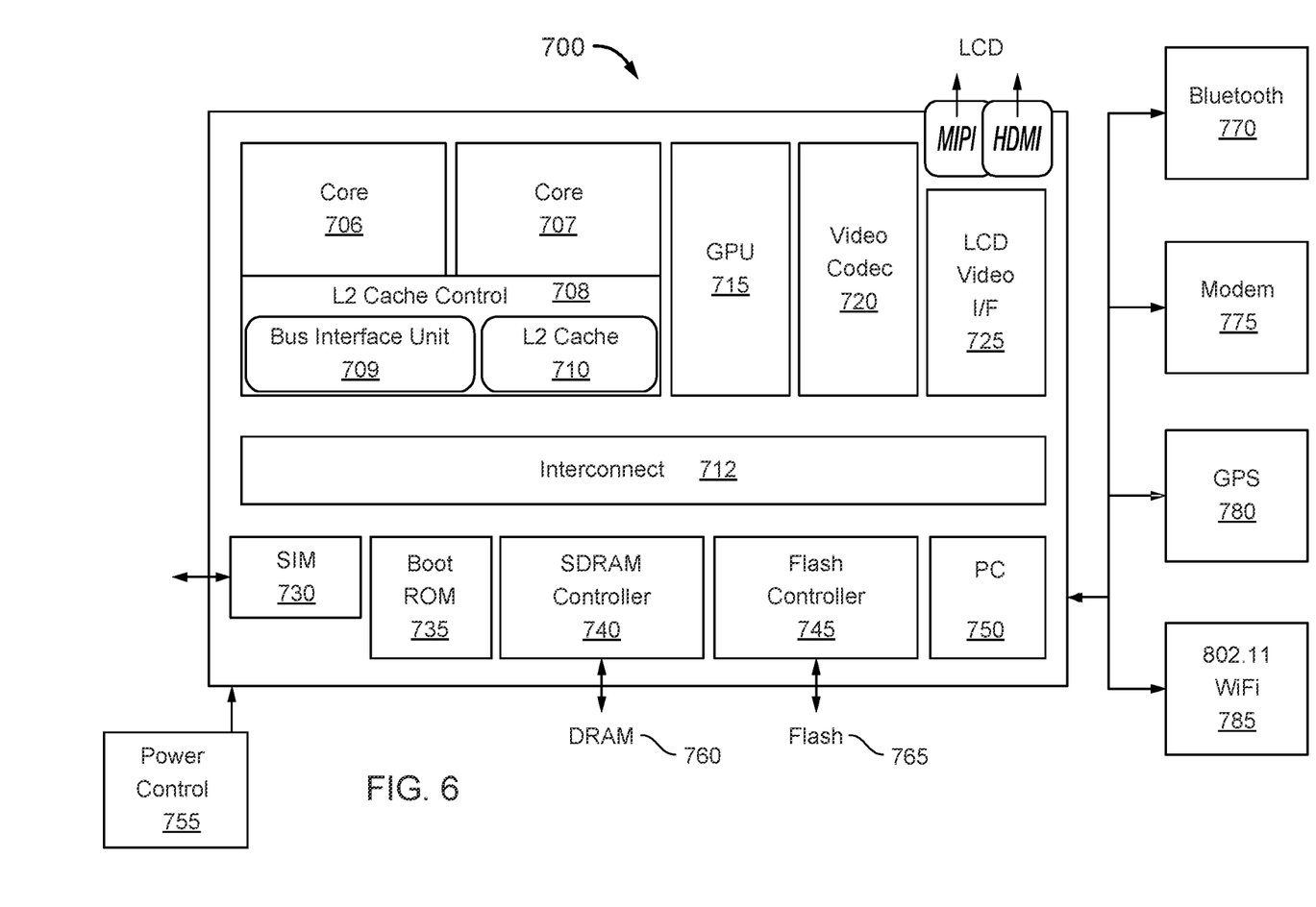
FIG. 6 is an embodiment of a system-on-chip design in accordance with an embodiment.

Turning next to FIG. 6, an embodiment of a SoC design in accordance with an embodiment is depicted. As a specific illustrative example, SoC 700 may be configured for insertion in any type of computing device, ranging from portable device to server system. Here, SoC 700 includes 2 cores 706 and 707. Cores 706 and 707 may conform to an instruction set architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700 via an interconnect 712.

Interconnect 712 provides communication channels to the other components, such as a Subscriber Identity Module (SIM) 730 to interface with a SIM card, a boot ROM 735 to hold boot code for execution by cores 706 and 707 to initialize and boot SoC 700, a SDRAM controller 740 to interface with external memory (e.g., DRAM 760), a flash controller 745 to interface with non-volatile memory (e.g., flash 765), a peripheral controller 750 (e.g., an eSPI interface) to interface with peripherals, video codecs 720 and video interface 725 to display and receive input (e.g., touch enabled input), GPU 715 to perform graphics related computations, etc. Any of these interconnects/interfaces may incorporate aspects described herein, including the ability to communicate according to multiple modes, including driving a clock signal by different link partners as described herein. In addition, the system illustrates peripherals for communication, such as a Bluetooth module 770, modem 775, GPS 780, and WiFi 785. Also included in the system is a power controller 755.

Figure 7:
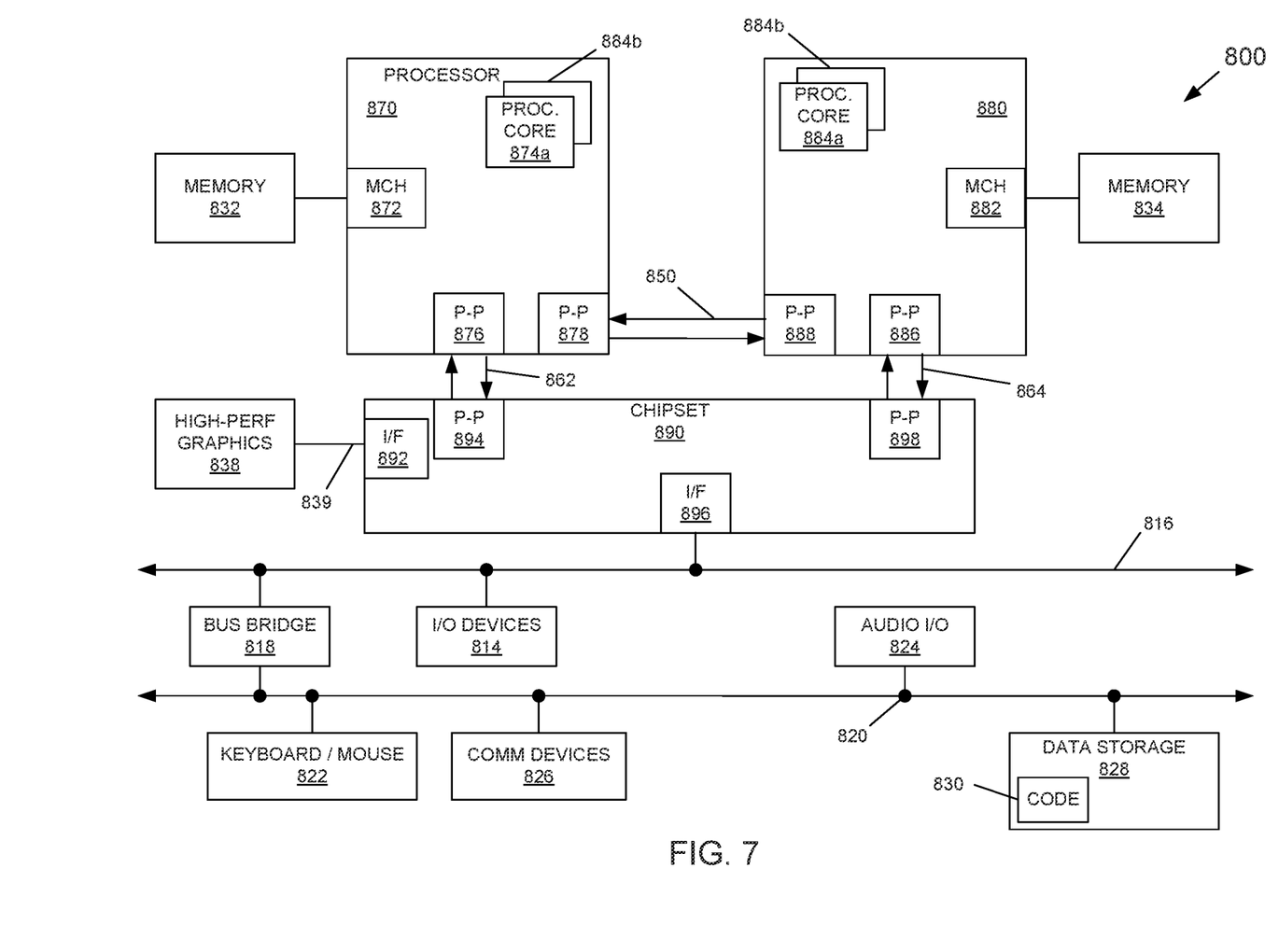
FIG. 7 is a block diagram of a system in accordance with an embodiment of the present invention.

Referring now to FIG. 7, shown is a block diagram of a system in accordance with an embodiment of the present invention. As shown in FIG. 7, multiprocessor system 800 includes a first processor 870 and a second processor 880 coupled via a point-to-point interconnect 850. As shown in FIG. 7, each of processors 870 and 880 may be many core processors including representative first and second processor cores (i.e., processor cores 874a and 874b and processor cores 884a and 884b).

Still referring to FIG. 7, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 7, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 864, respectively. As shown in FIG. 7, chipset 890 includes P-P interfaces 894 and 898.

Furthermore, chipset 890 includes an interface 892 to couple chipset 890 with a high performance graphics engine 838, by a P-P interconnect 839. As shown in FIG. 7, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Any of the devices shown in FIG. 7 may be configured to perform clock signaling control activities (including clock signal driving) for one or more of the interconnect structures, as described herein.

The following examples pertain to further embodiments.

In one example, an apparatus for controlling clock signaling on an interconnect comprises a host controller to couple to an interconnect to which a plurality of devices may be coupled. The host controller may include a clock control circuit to cause the host controller to communicate a clock signal on a clock line of the interconnect, the clock control circuit to receive an indication that a first device of the plurality of devices is to send information to the host controller and to dynamically release control of the clock line of the interconnect to enable the first device to drive a second clock signal onto the clock line of the interconnect for communication with the information, where the first device is a clock source capable device.

In an example, the host controller is to release the control of the clock line in response to an in-band interrupt from the first device, the first device comprising a slave device.

In an example, the apparatus further comprises a configuration storage to store configuration information for the plurality of devices, the configuration information to indicate whether each of the plurality of devices is a clock source capable device.

In an example, the host controller is to send a configuration request and the first device is to provide the configuration information of the first device in response thereto.

In an example, the configuration storage includes an entry for the first device, and where the configuration information comprises a clock source capability indicator to indicate that the first device is clock source capable.

In an example, the host controller is to request the control of the clock line after the first device sends a byte of the information and in response to the request, the first device is to release the clock line.

In an example, the host controller is to reclaim the control of the clock line when the clock line and a data line of the interconnect are at a first logic state.

In an example, the host controller is to receive the information from the first device according to the second clock signal at a clock rate higher than a native clock rate for the interconnect.

In an example, the host controller is to receive the information comprising unprocessed touch data from the first device at a clock rate higher than a native clock rate for the interconnect, the first device comprising a touchscreen controller.

In another example, a method for controlling clock signaling on a bus comprises: receiving, in a host controller of a bus, a request for a slave device to communicate information on the bus; determining whether the slave device has a clock source capability; and in response to determining that the slave device has the clock source capability, releasing control of a clock line of the bus to the slave device.

In an example, the request comprises an in-band interrupt, and the method further comprises sending a clock signal on the clock line to enable the slave device to communicate address information to the host controller.

In an example, the method further comprises accessing a configuration storage to determine whether the slave device has the clock source capability.

In an example, the method further comprises receiving configuration information from the slave device and storing at least a portion of the configuration information in the configuration storage, the portion of the configuration information including a clock source capability indicator for the slave device.

In an example, the method further comprises parking the clock line to a first logic state to release the control of the clock line.

In an example, the method further comprises reclaiming the control of the clock line of the bus after the slave device communicates the information.

In an example, the method further comprises identifying that the slave device is to release the control of the clock line when the clock line is at a first logic state and a data line of the bus is at the first logic state.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system for controlling clock signaling on a bus comprises: a first device coupled to a host controller via a bus to which a plurality of devices may be coupled, where the first device includes a first clock generation circuit to generate a first clock signal, the first device to send the first clock signal on the bus when granted clock source permission by the host controller; and the host controller coupled to the first device and having a host clock control circuit, in response to a determination that the first device has information to send to the host controller, to dynamically hand-off clock control for the bus from the host controller to the first device to enable the first device to send the information and the first clock signal via the bus.

In an example, the system further comprises a non-volatile storage to store configuration information for the plurality of devices, the configuration information to indicate whether each of the plurality of devices is a clock source capable device.

In an example, the host clock control circuit is to access the configuration storage to determine whether the first device is a clock source capable device.

In an example, the first device is to send the information comprising unprocessed touch data at a clock rate of the first clock signal, the clock rate of the first clock signal higher than a native clock rate for the bus.

In yet another example, an apparatus for controlling clock signaling on an interconnect comprises: means for communicating a clock signal on a clock line of an interconnect; means for receiving an indication that a first device of a plurality of devices coupled to the interconnect is to send information to the host controller; and means for dynamically releasing control of the clock line of the interconnect to enable the first device to drive a second clock signal onto the clock line of the interconnect for communication with the information, where the first device is a clock source capable device.

In an example, the means for dynamically releasing the control of the clock line is to release the control in response to an in-band interrupt from the first device, the first device comprising a slave device.

In an example, the apparatus further comprises configuration storage means for storing configuration information for the plurality of devices, the configuration information to indicate whether each of the plurality of devices is a clock source capable device.

In an example, the apparatus further comprises means for sending a configuration request to the first device to cause the first device to provide the configuration information to the means for receiving.

In an example, the apparatus further comprises means for requesting the control of the clock line after the first device sends a byte of the information, where in response to the request the first device is to release the clock line.

In an example, the apparatus further comprises means for reclaiming the control of the clock line when the clock line and a data line of the interconnect are at a first logic state.

In an example, the apparatus further comprises means for receiving the information from the first device according to the second clock signal at a clock rate higher than a native clock rate for the interconnect.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A slave device comprising:
a first driver to drive data on a data line of a bus to which a master device is coupled;
a second driver to drive a clock signal on a clock line of the bus; and
a clock circuit to generate the clock signal;
wherein the slave device is to:
  indicate to the master device that the slave device is a clock source capable device;
  send an in-band interrupt to the master device; and
  in response to a release of the clock line by the master device, send the clock signal on the clock line of the bus and send the data on the data line of the bus.

2. The slave device of claim 1, wherein the slave device is coupled to the bus comprising an I3C bus.

3. The slave device of claim 1, wherein the slave device is to send the in-band interrupt comprising an address of the slave device.

4. The slave device of claim 3, wherein slave device is to send a mandatory data byte following the address of the slave device.

5. The slave device of claim 3, wherein the slave device is to receive an acknowledgement from the master device in response to the address, the acknowledgement to indicate acceptance of the in-band interrupt.

6. The slave device of claim 1, wherein the slave device is to determine the release of the clock line by the master device when the clock line is in a first logic state.

7. The slave device of claim 1, wherein the slave device comprises a sensor.

8. A method comprising:
sending from a slave device to a master device coupled to the slave device via an I3C bus, an indication that the slave device is a clock source capable device;
sending, from the slave device to the master device, an in-band interrupt; and
after the master device releases a clock (SCL) line of the I3C bus:
  driving, by the slave device, a clock signal on the SCL line of the I3C bus; and
  driving, by the slave device, data on a data (SDA) line of the I3C bus.

9. The method of claim 8, further comprising driving the data comprising sensor information.

10. The method of claim 8, further comprising driving the data during a read operation.

11. A system comprising:
a master device;
one or more secondary master devices coupled to the master device via an I3C bus; and
a first slave device coupled to the master device via the I3C bus, the first slave device comprising:
  at least one sensor;
  a first driver to drive data on a data line of the I3C bus; and
  a second driver to drive a clock signal on a clock line of the I3C bus;
  wherein the first slave device is to:
    indicate to the master device that the first slave device is a clock source capable device; and
    in response to a release of the clock line by the master device, drive the clock signal on the clock line of the I3C bus and drive the data on the data line of the I3C bus.

12. The system of claim 11, wherein the first slave device is to send an in-band interrupt via the I3C bus.

13. The system of claim 12, wherein first slave device is to send the in-band interrupt comprising an address of the first slave device.

14. The system of claim 13, wherein first slave device is to send a mandatory data byte following the address of the first slave device.

15. The system of claim 13, wherein the first slave device is to receive an acknowledgement from the master device in response to the address, the acknowledgement to indicate acceptance of the in-band interrupt.

16. The system of claim 11, wherein the first slave device is to determine the release of the clock line by the master device when the clock line is in a first logic state.

17. The system of claim 11, wherein the first slave device comprises a configuration storage to store configuration information to indicate whether the first device is the clock source capable device.

18. The system of claim 11, further comprising a system on chip (SoC), the SoC comprising the master device.

19. The system of claim 11, further comprising a second slave device coupled to the master device via the I3C bus.

20. The system of claim 19, wherein at least one of the first slave device and the second slave device comprises an imaging sensor.

* * * * *